United States Patent [19]
Farb

[11] 3,730,038
[45] May 1, 1973

[54] SAW BLADE CONSTRUCTION

[76] Inventor: Joseph L. Farb, 1519 E. Northside Drive, Jackson, Miss. 39211

[22] Filed: Dec. 3, 1970

[21] Appl. No.: 94,665

[52] U.S. Cl. ...................... 83/837, 83/835, 29/95 B, 83/854, 83/855
[51] Int. Cl. ............................................. B27b 33/08
[58] Field of Search .............. 143/133 B, 133, 140 R, 143/145, 149; 29/95 B; 83/835, 837, 839

[56] References Cited

UNITED STATES PATENTS 2,694,423   11/1954   Lawson ........................... 143/141 X

*Primary Examiner*—Donald R. Schran
*Attorney*—John R. Walker, III

[57] ABSTRACT

A saw blade intended to be mounted on an arbor and rotatably driven thereby. The saw blade includes tungsten carbide tipped teeth; however, these tips are brazed into unique pockets or recesses providing structure that substantially precludes the heretofore hazardous possibility of the teeth being broken loose from the blade or separated from the braze. The saw blade further includes several tungsten carbide side cutting teeth spaced in a unique staggered arrangement about the blade at different distances radially from the center thereof to assure against pinching of the blade when sawing green lumber or the like, and cooling slots which obviate cracked and/or warped blades by allowing for expansion and contraction of the steel blade. It is within these cooling slots that the side cutting teeth are fixedly received in a manner which facilitates free access of an abrading wheel for movement therein to and fro along the length of each side cutting tooth for sharpening the teeth.

4 Claims, 3 Drawing Figures

Patented May 1, 1973 3,730,038

INVENTOR.
JOSEPH L. FARB
BY John R. Walker, III
attorney

SAW BLADE CONSTRUCTION

BACKGROUND OF THE INVENTION

1. Field of the Invention

This invention relates in general to certain new and useful improvements in saws and cutterheads, more particularly in tungsten carbide tipped circular saws and cutterheads.

2. Description of the Prior Art

A saw having carbide tipped teeth is not new. In fact, numerous patents have been allowed during the past decade as is evidenced by the following six patents known by the applicant: The Ferrari U.S. Pat. No. 3,048,207; the Heinemann U.S. Pat. No. 3,107,706; the Pearson U.S. Pat. No. 3,299,917; the Wilder U.S. Pat. No. 3,344,822; the Demsky U.S. Pat. No. 3,344,823; and the Cooper U.S. Pat. No. 3,406,729. Each of the above patents has structure for accomplishing a particular objective. However, the tungsten carbide tips are attached to the saw blade in a manner substantially identical one with the other and which has certain disadvantages. In other words, the tremendous leverage that is applied at the apex of the carbide tip is constantly pulling against the braze and frequently these carbide tips are broken loose from the blade or separated from the braze and are hurled through the air with a tremendous velocity, thus becoming a hazard to persons in the immediate vicinity.

The remaining prior art known by the applicant consists of the Scott U.S. Pat. No. 300,805; the Perkins U.S. Pat. No. 342,535; the Burkhardt U.S. Pat. No. 359,497; the Bartholomew U.S. Pat. No. 788,236; and the Sneva U.S. Pat. No. 2,563,559. The above latter group of patents each have structure for accomplishing a desired objective in engaging the sides of the blade with the lumber, e. g., planing the lumber, etc. It should also be pointed out that the 3,299,917, 3,344,822, and 3,344,823 patents, referenced in the former group of patents, also provides structure along the sides thereof for engaging the lumber. The 3,344,823 patent is an edger saw and has planing cutters for smoothing the cut surface of the wood. The 3,344,882 and 3,299,917 patents are provided with side cutting elements having objectives closely related to the objective of the present invention. However, certain distinct disadvantages are encountered when attempting to practice the patents 3,344,822 and 3,299,917. First, the carbide tips frequently are broken loose from the blade, a problem previously described. Secondly, renovating the blades requires special equipment, i. e., access to the side cutting elements with an abrading wheel is difficult, if not impossible. Thirdly, while both patents discuss the problems encountered when the blade overheats, neither have satisfactorily solved the problem. Fourthly, the hazards associated with hurling the broken tips from the blade and/or large slivers of wood through the air are ever prevalent with the latter-mentioned patents.

The applicant also has knowledge of a saw identified as a "strobe saw" licensed by Warehauser Co. The so-called "strobe saw" appears to have solved the problem of overheating, thereby providing two radially aligned cooling slots arranged 180° about the circumference of the saw. Additionally, the strobe saw includes two rather long elements of tungsten carbide which are fixedly attached to the saw so that they project into the slots. However, the other disadvantages enumerated earlier still prevail with the strobe saw. Additionally, tremendous force is exerted on the side cutting elements since the elements have such a relatively long length. Side cutting teeth do not necessary engage both sides of the kerf simultaneously and/or with equal friction. Accordingly, tooth engagement of one side of the kerf exerts unequal force on the braze, tending to rotate the tooth to one side of the blade. As a result, these side cutting elements are frequently broken loose from the blade and hurled through the air. Their relatively large size and the extreme velocity thereof presents a greater hazard to persons in the area than does the smaller perimeter teeth. Also, carbide being a very expensive element, replacement costs for these large teeth over a period of time become exorbitant.

SUMMARY OF THE INVENTION

The present invention is directed towards overcoming the disadvantages and problems relative to previous saw blades. The concept of the present invention is first to fixedly place the tungsten carbide tip or perimeter teeth into special designed pockets or recesses. This assures safety of the tip being knocked out or separated from its braze due to leverage occurring at the point of impact of the cut at the cutting edge. This also assures greater tool edge life, thereby greatly reducing machine down time for tool changes, a fact which reduces over-all operational costs.

Secondly, the saw blade of the instant invention is provided with special "break up chip" style side cutting teeth. Teeth of this type of design assures safety as well as guaranteeing cool machining of stock, the blade cannot pinch or bind in the kerf. This improvement of design allows longer cutting life betseen renovating or servicing, less machine down time from blade changes, again adding to reduced over-all operational costs.

Thirdly, the saw blade of the present invention is provided with combination cooling and braze receiving slots. Using a slot of this design serves a dual purpose, a carrier or receiver for "break up chip" side cutting teeth and cooling slot allowing expansion and contraction of the steel blade without the age old problem of cracked saw blades. This feature again insures greater safety, as well as extended life between renovating cycles of the blade, further contributing to the operational cost reducing factor.

Fourthly, the saw blade of the present invention is provided with a shoulder adjacent the lower portion of the perimeter carbide tips. As the wood chip is cut from the lumber, it curls and goes into the gullet. This chip engages the shoulder which breaks the chip into pieces. This feature produces a much better chip flow out of the gullet of the saw, particularly at high speed operation.

Green lumber has a tendency to swell immediately after being cut, due to its moisture content. As a result, the severed surfaces or the kerf tends to close in on the conventional blade or bind it. The attempt to obviate this problem in the known prior saw blades is to design the saw blade so as to cut a wide kerf. However, I have discovered that by distributing the side cutting teeth about the area of the saw blade in a staggered arrangement, that the green lumber cannot pinch the teeth, and I have been able to reduce the size of the kerf without pinching the blade. In other words, the wider the kerf, the more of the lumber is wasted, and the higher is the power requirements for driving the blade. This is particularly significant when large cants, e. g., having a cross sectional dimension of 24 × 10 inches, down to 10 × 10 inches, etc., are fed into a battery of saws. A typical arrangement in an arbor might have from 6 to 30 saw blades cutting the upper half of the cant and an equal number of saw blades cutting the lower half of the cant aligned to track in the same corresponding kerfs. Accordingly, the primary object of the present invention is to provide a saw or cutterhead to machine wood and wood products in a safer and more economical manner, in keeping with modern high production requirements.

DESCRIPTION OF THE PREFERRED EMBODIMENT

Figure 1:
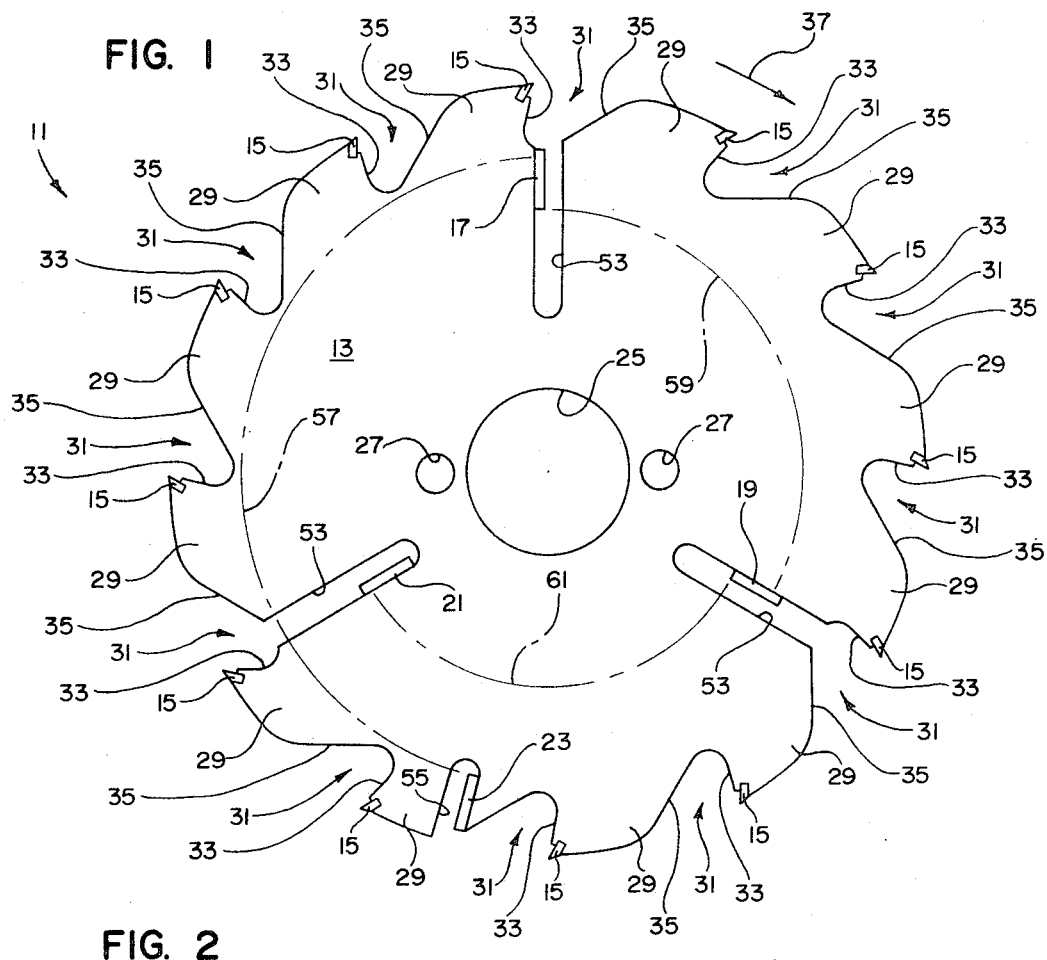
FIG. 1 is a side elevational view of the saw blade of the present invention.

The arbor-driven rotatable circular saw of the present invention is herein character referenced by the numeral 11 and generally includes a blade or main body portion 13, a plurality of tungsten carbide tips 15, and a plurality of elongated tungsten carbide slugs or "-break up chip" side cutting teeth 17, 19, 21, 23.

The blade or main body 13 is provided with a concentric aperture 25 for receiving the conventional rotatable structure of an arbor. It is anticipated that the blade 11 of the present invention will find more prevalent use in arbors having a battery of blades, i. e., the blades 11 being axially aligned about a common rotating shaft and spaced apart a predetermined distance depending upon the width of the preferred cut, by a spacer (not shown). In this regard, the area of the main body 13 radially adjacent outwardly from the aperture 25 is intended to be contiguously engaged by a spacer. For this purpose, the main body 13 preferably is provided with a pair of apertures 27 for receiving elongated rodlike bolts which extend through the plurality of blades 11 and the couplings for securing the blades 11 to the rotating structure, i. e., obviating the likelihood of the blades 11 slipping in relationship to the rotating structure of the arbor or one with the other.

The saw 11 includes a plurality of symmetrically arranged circumferentially disposed serrated portions 29 defining scalloplike gullets 31 about the periphery of the main body 13, the body 13 being typically formed from steel or the like. Each of the serrated portions 29 includes a leading edge 33 and a trailing edge 35 with respect to the direction of rotation of the blade 11, the preferred direction of rotation being clockwise and as indicated by an arrow character referenced by the numeral 37.

Figure 2:
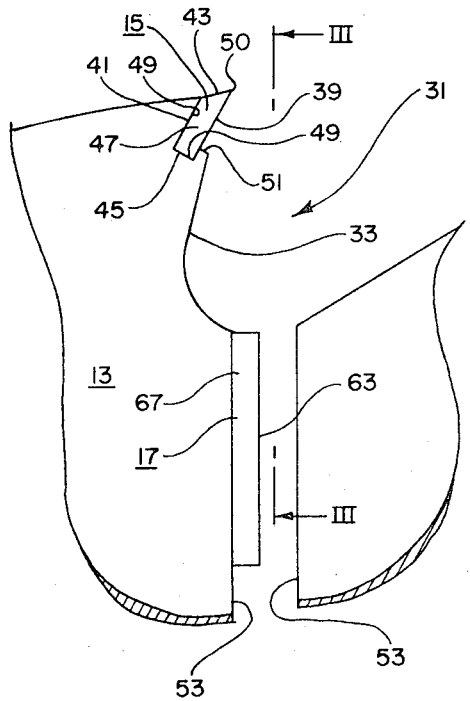
FIG. 2 is an enlarged fragmentary view of the uppermost portion of the saw blade in FIG. 1, showing a tungsten carbide tip, a gullet, a cooling slot, and a "-break up chip" or side cutting tooth.

The tungsten carbide tips 15 have a front face portion 39, a back face portion 41, an upper face portion 43, a lower face portion 45, and two side face portions 47. The serrated portions 29 respectively are provided with grooves 49 (FIG. 2) adjacent the leading edges 33 thereof. The grooves 49 are substantially complementary and conform to the shape of the lower portion of tungsten carbide tips 15. The tips 15 are fixedly received in the grooves 49 so that the back and lower face portions 41, 45 contiguously engage the corresponding portions of blade 13 defining the grooves 49 and a portion of the front faces 39 contiguously engages a corresponding portion of the blade 13 defining the groove 49. The tips 15 are fixedly attached to the main body 13 in any well known manner, e. g., brazing, silver soldering, or the like. The number of teeth per blade and the style of the tooth, i. e., design geometrics of the tooth, are well known techniques which generally are governed by the species of wood, i. e., green or dry and hard or soft, rpm of the arbor, and feed rate of the stock being fed to the blade.

It should be understood that as the saw 11 rotatably engages the lumber, the apex 50 of the tips 15, i.e., the edge adjacent the front face portion 39 and the upper face portion 43, experiences tremendous leverage. From FIG. 2 of the drawings, it may be seen that this force acts upon the tips 15 in such a manner that the edge adjacent the back face portion 41 and the upper face portion 43 acts as a fulcrum and in the prior known art the corresponding tips frequently become broken loose from the blade. However, the saw 11 of the present invention obviates this problem by substantially locking the tips 15 into the grooves 49, i. e., the grooves 49 acting as pockets prevent the lower end of the tips 15 from rotating counterclockwise (FIG. 2) about the edge previously described as the fulcrum.

Figure 3:
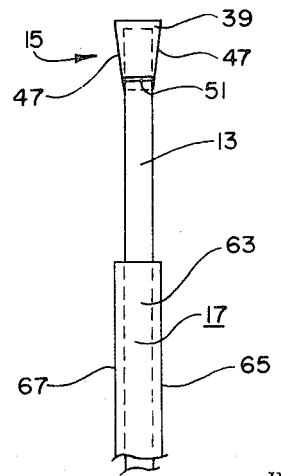
FIG. 3 is a sectional view taken as on the line III—III of FIG. 2.

From FIG. 3 of the drawings, it may be seen that the distance between the side surfaces 47 is greater than the thickness of the main body 13, at least where the sides 47 meet the edge adjacent the front face portion 39 and the upper face portion 43. Obviously, the distance between these two side face portions 49 establishes the width of the kerf which the saw 11 provides as it rotatably engages a piece of lumber. Accordingly, the wider the kerf the greater is the leverage applied to the tips 15 or conversely, the narrower the kerf, the less force is applied to the tips 15. In this regard, the saw 11 of the present invention, having a relative narrow kerf, further obviates the possibility of the tips 15 being broken loose from the main body 13. This is based on known prior art which depended upon providing a wide kerf to obviate the problem of binding the saw.

Another important feature of the saw 11 of the present invention is the shoulder portions 51 (FIG. 2) defining minute faces directed generally radially outwardly from the aperture 25. The shoulder portions 51 of the main body 13 are arranged so that the faces thereof are disposed substantially perpendicular to the front face portions 39 of the tips 15. The shoulder portions 51 produce a much better chip flow out of the gullets 31, particularly when the saw 11 is operated at a high speed. In other words, as the tips 15 chip off a piece of wood, particularly green lumber, the chip is usually curled and goes into the gullet; however, the shoulder portions 51 do not permit the chip to curl into the gullet because of the substantial perpendicular relationship of the shoulder portion 51 with the face portions 39 of the tips 15, i. e., as the wood chip engages the shoulder portions 51, the wood chip is broken up.

The main body or blade 13 is provided with several cooling slots 53. These slots 53 extend radially inwardly from a point adjacent the periphery of the blade 13, preferably extending inwardly from appropriate gullets 31, and terminating a predetermined distance radially outwardly from the aperture 25. The length of the slots 53 is determined by the diameter of the blade 13 and the diameter of the spacer collars, not shown, but described earlier in the disclosure. In other words, the slots 53 terminate a distance, e. g., ⅛ inch, short of the circumferential edge of the spacer. The slots 53 allow for expansion and contraction of the steel blade, obviating the well known problem of cracked saw blades. It should be understood that FIG. 1 of the drawings depicts three cooling slots 53. However, the invention is not to be so limited since the number of the cooling slots 53 is governed by the intended rpm of the arbor and the feed speed of the lumber as it is fed to the saw.

The cooling slots 53 respectively receive the slugs or side cutting teeth 17, 19, 21. The slugs 17, 19, 21, being formed from tungsten carbide or the like, have a thickness dimension at least greater than that of the main body blade 13 but is never greater than that of the tips 15 which establish the width of the kerf. The respective side cutting teeth 17, 19, 21 are fixedly attached, in any well known manner, e. g., brazing, silver soldering or the like, to the portion of the blade 13 defining the trailing edges of the slots 53 and are spaced in a unique staggered arrangement at different distances radially from the aperture 25.

The staggered arrangement of the side cutting teeth 17, 19, 21 assures broken chips, as opposed to the action of certain prior saws which incorporate relatively long pieces of carbide constituting side cutting teeth and obviously the wood sliver severed by these teeth has a length substantially equal to the length of the side cutting tooth. These large slivers are thrown from the saw at a tremendous velocity and are a hazard to persons in the vicinity. The saw 11 of the present invention reduces the size of the slivers greatly so they are substantially no longer a hazard. The length of each side cutting tooth 17, 19, 21 is determined by the number of teeth needed considering arbor speed and feed speed. Obviously, the number of side cutting teeth would not exceed the number of cooling slots 53. In this regard, the width of the slots 53 is governed by the thickness of the tungsten carbide used plus a suitable clearance for a diamond grinding wheel used in initial manufacturing of the saw 11 and also in renovating used saws 11.

The main body blade 13 preferably is further provided with at least one additional radial slot 55 which is considerably shorter than the slots 53. The slot 55 extends inwardly from the outer periphery of the blade 13 and terminates a distance radially closer to the aperture 55 than the innermost edge of the gullets 31. The width of the slot 55 preferably is identical to the width of the slots 53. The slug 23, having a thickness substantially equal to the thicknesses of the slugs 17, 19, 21, is fixedly attached to the portion of the blade 13 defining the trailing edge of the slot 55 in any well known manner, e. g., brazing, silver soldering or the like.

FIG. 1 of the drawings shows a phantom line character referenced by the numeral 57 which represents the innermost edge of a generatrix described by the slug 23 as the saw 11 is rotated. Additionally, a phantom line 59 represents the innermost edge of a generatrix described by the slug 17 as the saw 11 is rotated. Further, a phantom line 61 describes the innermost edge of a generatrix described by the slug 19 as the saw 11 is rotated. It should now be obvious that the unique arrangement of the slugs 17, 19, 21, 23 eliminates voids and assures clean side cutting throughout the complete depth of the kerf. The "break up chip" side cutting teeth, 17, 19, 21, 23 covers a complete depth of which the blade 13 is imbedded in the cut, i. e., from outside diameter to within a fraction of an inch of the spacer, e. g., ⅛ inch or the like. This feature assures cool operation and the blade 13 cannot pinch or bind in the kerf. It should be noted that there is considerable overlap, preferably 10 percent, of one generatrix to another.

The "break up chip" action of these teeth 17, 19, 21, 23 is a very important safety factor, as each tooth equally breaks up the side cutting span, thereby eliminating the prevailing hazard of throwing a large wood splinter endangering persons in the vicinity.

It should be observed that the respective leading edges of the side cutting teeth 17, 19, 21, 23 preferably are aligned radially so that the entire length thereof may engage an irregular surface of the kerf when the blade 11 is rotated. The side cutting teeth 17, 19, 21, 23 protrude beyond the surfaces on both sides of the main body or blade 13, as best viewed in FIG. 3 for the side cutting tooth 17. In other words, the slugs 17, 19, 21, 23 respectively have face portions 63 (FIG. 3) and side face portions 65, 67. The edge at the intersection of the face portions 63, 65 is sharpened so as to dig into the wood and the edge at the intersection of the face portions 63, 67 is likewise sharpened so that both sides of the saw 11 is constantly providing additional width to the kerf by chipping away wood as it swells, thus obviating the problem of binding.

Although the invention has been described and illustrated with respect to a preferred embodiment thereof, it is not to be so limited since changes and modifications may be made therein which are within the full intended scope of the invention.

I claim:

1. An arbor-driven rotatable circular saw for severing a work piece, said saw comprising an annular planer saw blade provided with a concentric aperture for receiving rotatable structure of the arbor, said blade including a plurality of serrated portions spaced about the periphery of said blade and defining gullets therebetween, said serrated portions having leading and trailing edges with respect to the direction of rotation of said blade, a plurality of tungsten carbide tips for engaging the workpiece as said blade rotates and for removing chips therefrom, said blade being provided with a plurality of grooves disposed respectively adjacent said leading edges of said serrated portions, said grooves respectively fixedly receiving said tips so that respective portions of said tips define in part said gullets, said serrated portions respectively including shoulder portions adjacent said portions of said tungsten carbide tips defining in part said gullets, said shoulder portions defining minute faces directed generally radially outwardly from said concentric aperture of said blade for abruptly redirecting said chips towards said gullets and for causing said chips to be broken into smaller particles, said saw blade additionally being provided with several uniformly spaced radial slots extending inwardly from selected several of said gullets and terminating a predetermined distance radially outwardly from said aperture, and several elongated tungsten carbide slugs, each of said slugs includes remote cutting edges and has a thickness dimension which is at least greater than that of said blade but no greater than that of said plurality of tips, said slugs respectively being centered with respect to the thickness of said blade whereby said cutting edges extend substantially equal distances outwardly from the main surfaces of said blade, said slugs being fixedly attached to the portion of said blade defining the trailing edges of said slots, each of said slots being considerably longer than any of said slugs, and said slugs being arranged at staggered distances radially outwardly from said aperture whereby rotation of the saw is effective to cause each slug to describe a broad generatrix of any one slug is partially overlapped by at least another said generatrix.

2. The saw of claim 1 which is further provided with at least one additional radial slot which is considerably shorter than said several slots, said additional slot extending inwardly from the outer periphery of said saw blade and terminating a distance radially closer to said concentric aperture of said saw blade than does said gullets, and which includes at least one additional elongated tungsten carbide slug, said additional slug includes remote cutting edges and has a thickness substantially equal to that of said several slugs said additional slug being centered with respect to the thickness of said blade whereby said cutting edges extend substantially equal distance outwardly from the main surface of said blade, said additional slug being fixedly attached to the portion of said blade defining the trailing edge of said additional slot and being arranged radially outwardly from said concentric aperture whereby rotation of the saw is effective to cause said additional slug to describe a broad generatrix having a diameter different from said generatrices of said several slugs and with the generatrix of said additional slug partially extending overlappingly into at least one of said generatrices of said several slugs.

3. An arbor-driven rotatable circular saw for severing a workpiece, said saw comprising an annular planar saw blade provided with a concentric aperture for receiving rotatable structure of the arbor, said blade including, a plurality of symmetrically arranged circumferentially disposed serrated portions spaced apart and defining scalloplike gullets about the periphery of said blade, said serrated portions having leading and trailing edges with respect to the direction of rotation of said blade, a plurality of tungsten carbide tips for engaging the workpiece as said blade rotates and for removing slivers therefrom, said serrated portions of said blade respectively being provided with grooves adjacent said leading edges thereof said grooves respectively fixedly receiving said tungsten carbide tips said leading edges of said serrated portions of said blade respectively including shoulder portions defining minute faces directed generally radially outwardly from said concentric aperture of said blade for abruptly redirecting said slivers towards said gullets and for causing said slivers to be broken into small chips, said blade additionally being provided with several radial slots extending inwardly from a point adjacent the periphery of said blade and terminating adjacent said concentric aperture, and several elongated tungsten carbide slugs, each of said slugs including remote cutting edges and a thickness dimension which is at least greater than that of said blade but no greater than that of said plurality of tips said slugs respectively being centered with respect to the thickness of said blade whereby said cutting edges extend equal distance outwardly from the main surfaces of said blade, said slugs being fixedly attached to the portion of said blade defining the trailing edge of said slots, each of said slots being considerably longer than any one of said slugs, and said slugs being arranged at staggered distances radially outwardly from said aperture whereby rotation of the saw is effective to cause each slug to describe a broad generatrix which has a diameter different from the other and the generatrix of any one slug is partially overlapped by at least another generatrix.

4. An arbor-driven rotatable circular saw for severing a work piece, said saw comprising an annular planer saw blade provided with a concentric aperture for receiving rotatable structure of the arbor, said blade including a plurality of serrated portions spaced about the periphery of said blade and defining gullets therebetween, said serrated portions having leading and trailing edges with respect to the direction of rotation of said blade, a plurality of tungsten carbide tips for engaging the workpiece as said blade rotates and for removing chips therefrom, said blade being provided with a plurality of grooves disposed respectively adjacent said leading edges of said serrated portions, said grooves respectively fixedly receiving said tips so that respective portions of said tips define in part said gullets, said saw blade additionally, being provided with several uniformly spaced radial slots extending inwardly from selected several of said gullets and terminating a predetermined distance radially outwardly from said aperture, and several elongated tungsten carbide slugs, each of said slugs includes remote cutting edges and has a thickness dimension which is at least greater than that of said blade but no greater than that of said plurality of tips, said slugs respectively being centered with respect to the thickness of said blade whereby said cutting edges extend substantially equal distances outwardly from the main surfaces of said blade, said slugs being fixedly attached to the portion of said blade defining the trailing edges of said slots, each of said slots being considerably longer than any of said slugs, and said slugs being arranged at staggered distances radially outwardly from said apertures whereby rotation of the saw is effective to cause each slug to describe a broad generatrix having a diameter different from the other and the generatrix of any one slug is partially overlapped by at least another said generatrix.

* * * * *